(12) United States Patent
Janssen et al.

(10) Patent No.: US 11,681,588 B2
(45) Date of Patent: Jun. 20, 2023

(54) PERFORMING CONDITIONAL SNAPSHOT CREATION DURING CONTINUOUS DATA PROTECTION AGE-OUT

(71) Applicant: International Business Machines Corporation, Armonk, NY (US)

(72) Inventors: Travis Janssen, San Jose, CA (US); Sangeetha Seshadri, Plano, TX (US); Umesh Deshpande, San Jose, CA (US); Nicholas Linck, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/409,491

(22) Filed: Aug. 23, 2021

(65) Prior Publication Data

US 2023/0067337 A1   Mar. 2, 2023

(51) Int. Cl.
*G06F 11/14* (2006.01)
*G06F 3/06* (2006.01)

(52) U.S. Cl.
CPC ......... *G06F 11/1461* (2013.01); *G06F 3/067* (2013.01); *G06F 3/0619* (2013.01); *G06F 3/0659* (2013.01); *G06F 11/1451* (2013.01); *G06F 11/1464* (2013.01); *G06F 11/1469* (2013.01); *G06F 2201/84* (2013.01)

(58) Field of Classification Search
CPC ............... G06F 11/1461; G06F 3/0659; G06F 11/1451; G06F 11/1464; G06F 11/1469; G06F 2201/84

USPC ........................................................ 714/6.3
See application file for complete search history.

(56) References Cited

U.S. PATENT DOCUMENTS

| | | |
|---|---|---|
| 6,732,125 B1 | 5/2004 | Autrey et al. |
| 8,712,970 B1 | 4/2014 | Sim-Tang |
| 9,632,875 B2 | 4/2017 | Raichstein et al. |
| 10,198,321 B1 | 2/2019 | Gordon |
| 10,423,493 B1 | 9/2019 | Vig et al. |
| 10,705,920 B1 * | 7/2020 | Holenstein ............. G06F 16/27 |
| 10,754,844 B1 | 8/2020 | Jain et al. |
| 2011/0296237 A1 * | 12/2011 | Mandagere ........... G06F 11/079 |
| | | 714/E11.029 |

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.

(Continued)

*Primary Examiner* — Yair Leibovich
(74) *Attorney, Agent, or Firm* — Zilka-Kotab, P.C.

(57) ABSTRACT

A computer-implemented method according to one embodiment includes creating a log of one or more events occurring during a performance of continuous data protection (CDP) for an instance of data; in response to identifying a conclusion of the performance of CDP for the instance of data, determining a value for the one or more events within the log; and conditionally creating and storing a snapshot of the instance of data, based on a comparison of the value for the one or more events to a predetermined threshold.

20 Claims, 5 Drawing Sheets

(56) References Cited

OTHER PUBLICATIONS

Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
Anonymous, "Automatic Event-Driven Backup Recommendation Engine in Database Deployments," IP.com Prior Art Database, Technical Disclosure No. IPCOM000263492D, Sep. 4, 2020, 6 pages.

* cited by examiner

PERFORMING CONDITIONAL SNAPSHOT CREATION DURING CONTINUOUS DATA PROTECTION AGE-OUT

BACKGROUND

The present invention relates to data protection, and more particularly, this invention relates to conditionally creating snapshots of versioned data during an age-out process of a continuous data protection implementation.

Continuous data protection (CDP) is a valuable tool for minimizing data loss for an instance of data by storing each version of an instance of data that is created over a predetermined time period. However, performing CDP is resource and storage intensive, and when the predetermined CDP time period has concluded for an instance of data current methods do not maintain previously acquired version information for the instance of data and merely revert back to manual or periodic backup operations.

BRIEF SUMMARY

A computer-implemented method according to one embodiment includes creating a log of one or more events occurring during a performance of continuous data protection (CDP) for an instance of data; in response to identifying a conclusion of the performance of CDP for the instance of data, determining a value for the one or more events within the log; and conditionally creating and storing a snapshot of the instance of data, based on a comparison of the value for the one or more events to a predetermined threshold.

According to another embodiment, a computer program product includes one or more computer readable storage media, and program instructions collectively stored on the one or more computer readable storage media, the program instructions including instructions configured to cause one or more processors to perform a method including creating, by the one or more processors, a log of one or more events occurring during a performance of continuous data protection (CDP) for an instance of data; in response to identifying a conclusion of the performance of CDP for the instance of data, determining, by the one or more processors, a value for the one or more events within the log; and conditionally creating and storing, by the one or more processors, a snapshot of the instance of data, based on a comparison of the value for the one or more events to a predetermined threshold.

According to another embodiment, a system includes a processor; and logic integrated with the processor, executable by the processor, or integrated with and executable by the processor, where the logic is configured to create a log of one or more events occurring during a performance of continuous data protection (CDP) for an instance of data; in response to identifying a conclusion of the performance of CDP for the instance of data, determine a value for the one or more events within the log; and conditionally create and store a snapshot of the instance of data, based on a comparison of the value for the one or more events to a predetermined threshold.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of performing conditional snapshot creation during continuous data protection age-out.

In one general embodiment, a computer-implemented method includes creating a log of one or more events occurring during a performance of continuous data protection (CDP) for an instance of data; in response to identifying a conclusion of the performance of CDP for the instance of data, determining a value for the one or more events within the log; and conditionally creating and storing a snapshot of the instance of data, based on a comparison of the value for the one or more events to a predetermined threshold.

In another general embodiment, a computer program product includes one or more computer readable storage media, and program instructions collectively stored on the one or more computer readable storage media, the program instructions including instructions configured to cause one or more processors to perform a method including creating, by the one or more processors, a log of one or more events occurring during a performance of continuous data protection (CDP) for an instance of data; in response to identifying a conclusion of the performance of CDP for the instance of data, determining, by the one or more processors, a value for the one or more events within the log; and conditionally creating and storing, by the one or more processors, a snapshot of the instance of data, based on a comparison of the value for the one or more events to a predetermined threshold.

In another general embodiment, a system includes a processor; and logic integrated with the processor, executable by the processor, or integrated with and executable by the processor, where the logic is configured to create a log of one or more events occurring during a performance of continuous data protection (CDP) for an instance of data; in response to identifying a conclusion of the performance of CDP for the instance of data, determine a value for the one or more events within the log; and conditionally create and store a snapshot of the instance of data, based on a comparison of the value for the one or more events to a predetermined threshold.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
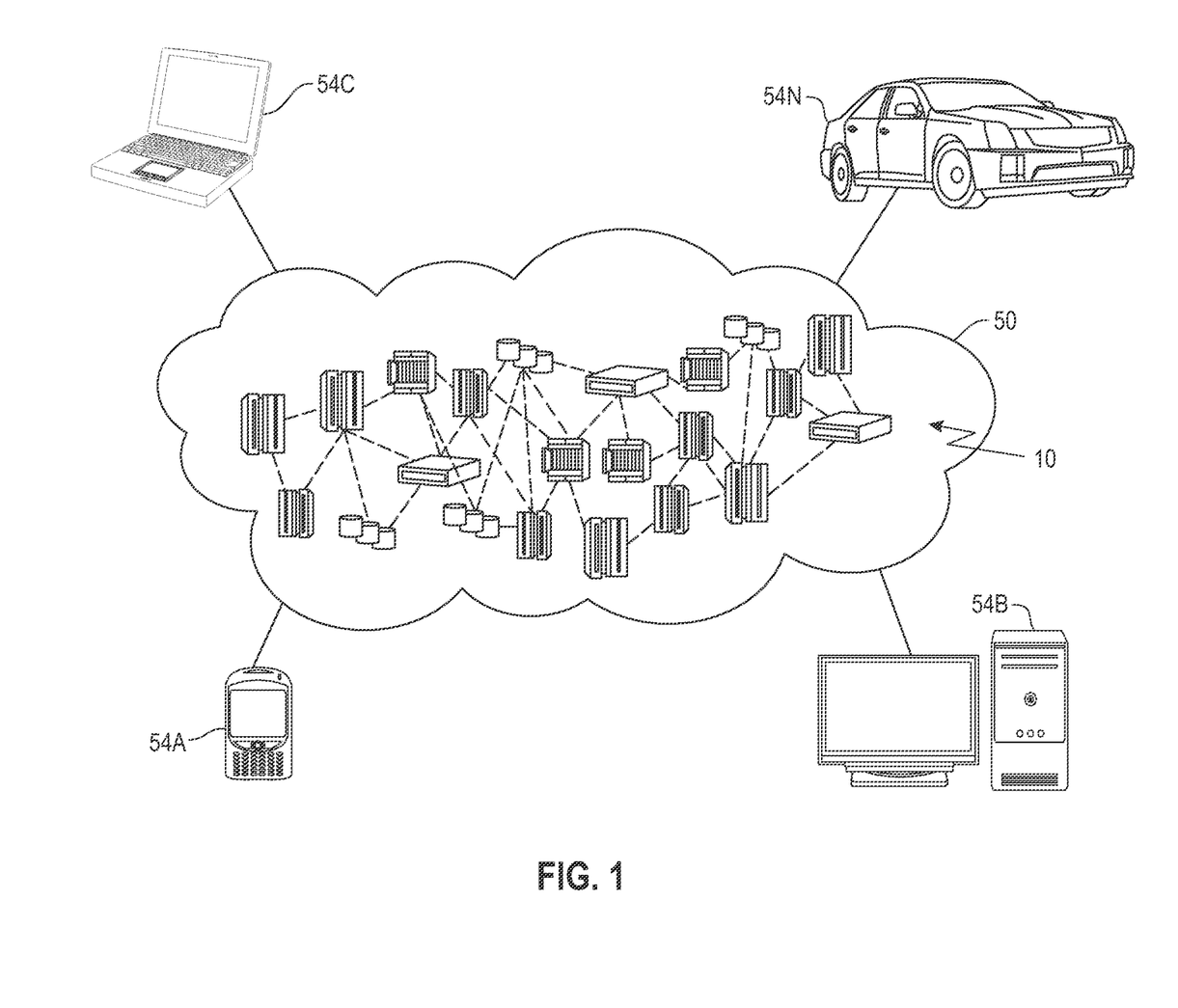
FIG. 1 depicts a cloud computing environment in accordance with one embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
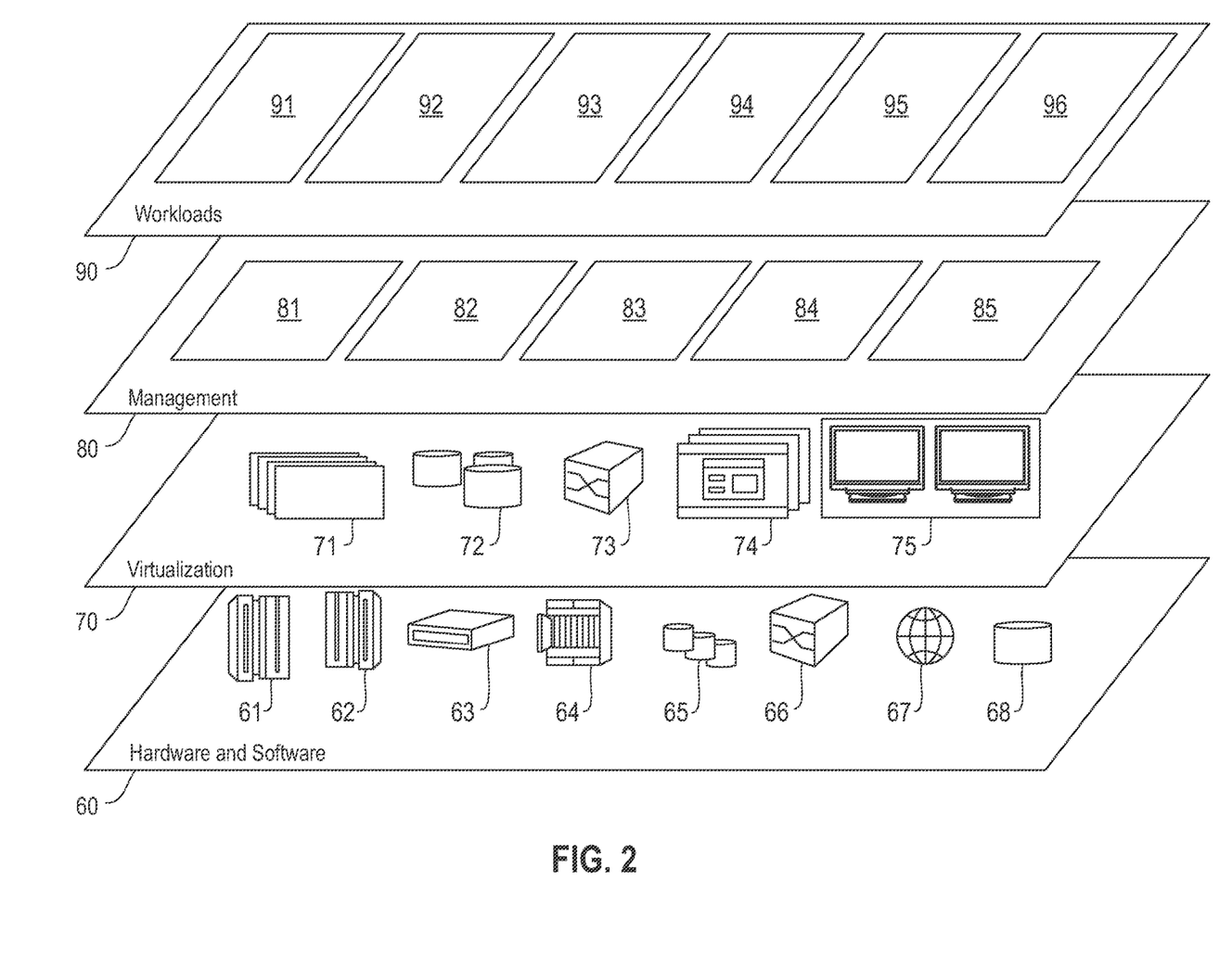
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and continuous data protection 96.

Figure 3:
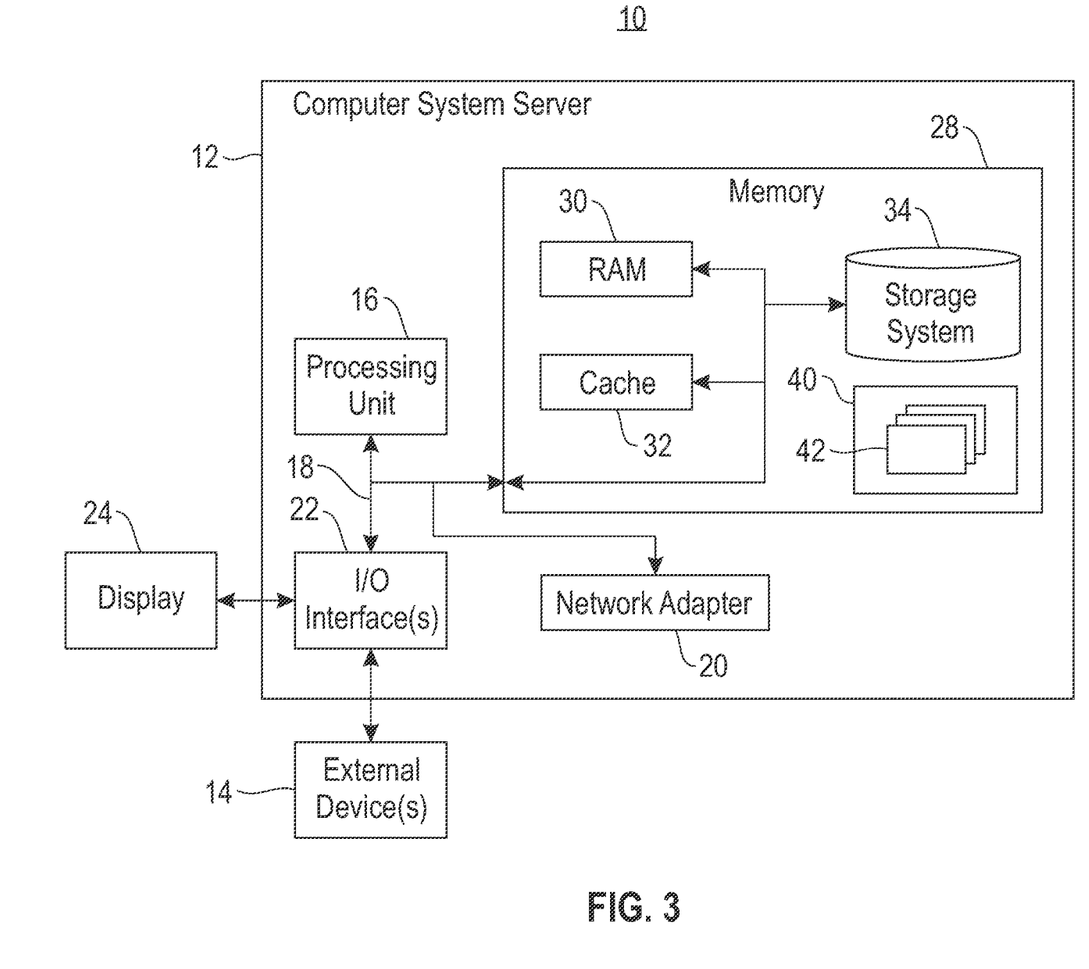
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
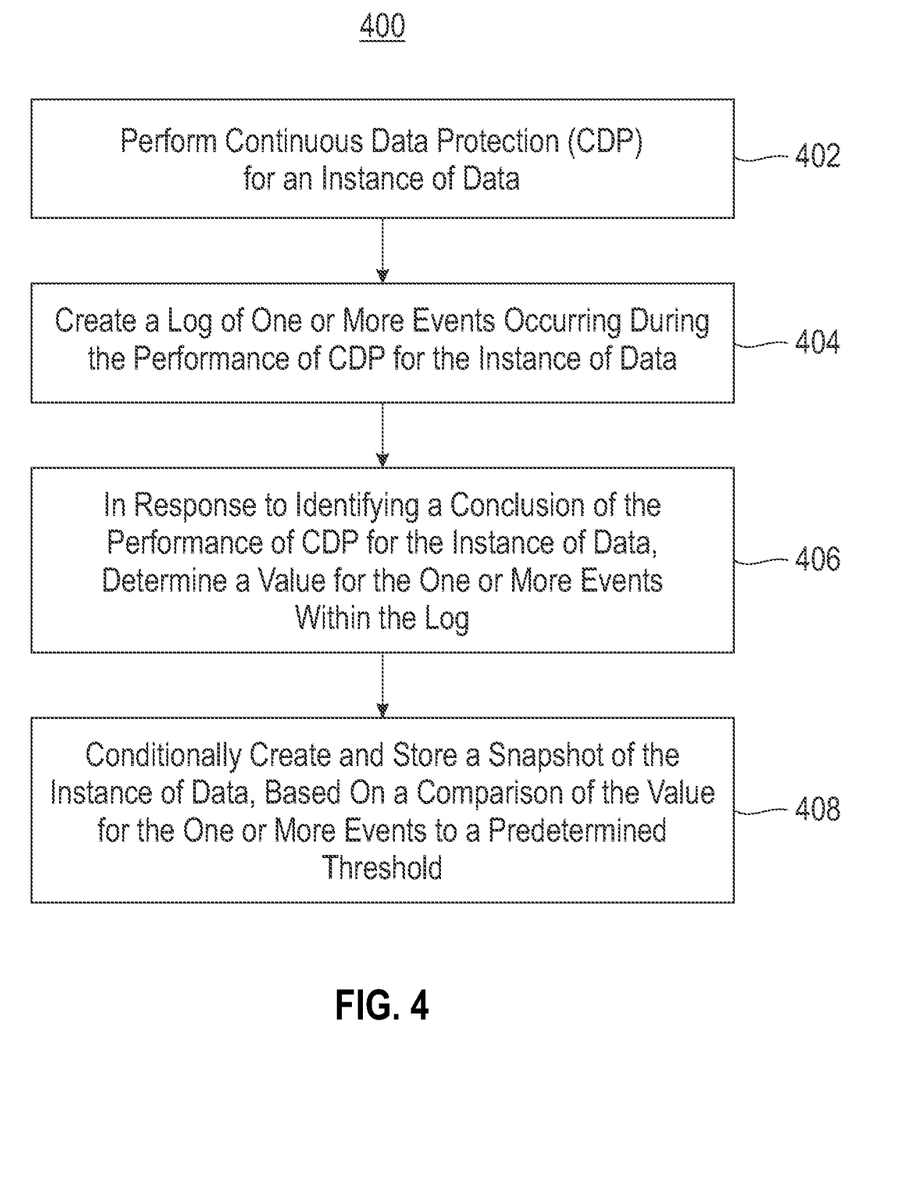
FIG. 4 illustrates a flowchart of a method for performing conditional snapshot creation during continuous data protection age-out, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where continuous data protection (CDP) is performed for an instance of data. In one embodiment, CDP may be performed for the instance of data for a predetermined time period. In another embodiment, the instance of data may include any data stored within a system (e.g., a storage device, a computing device, a server, a mobile computing device, etc.). For example, the instance of data may include one or more files, one or more predetermined portions of data storage, etc. In yet another embodiment, a user may select the instance of data, and may request that CDP be performed for the instance of data.

Additionally, in one embodiment, CDP may be initiated for the instance of data in response to one or more policies. For example, one or more characteristics of the instance of data may be applied to one or more policies, and a the one or more policies may indicate that CDP is to be performed for the instance of data. In another embodiment, CDP may be initiated for the instance of data in response to an analysis of metadata for the instance of data. For example, the metadata for the instance of data may be applied to one or more policies, which may indicate that CDP is to be performed for the instance of data.

Further, in one embodiment, during the performance of CDP for the instance of data, a plurality of versions of the instance of data may be created. For example, during the performance of CDP for the instance of data, a new version of the instance of data may be created and stored in a predetermined storage location each time the instance of data is changed (e.g., by one or more applications, by one or more users, etc.). In another embodiment, each time a write or delete operation is performed on the instance of data, a new version of the instance of data may be created and stored in a predetermined storage location.

For example, the predetermined storage location may include a log (e.g., a CDP log, etc.) that is physically separate from a storage location where the instance of data is stored. In another example, the instance of data may be stored at a first data drive of a device, and the log may be located at a separate data drive of a separate device. In this way, each time a write or delete operation is performed on the instance of data at a first storage location, a new version of the instance of data may be created and stored in a second storage location separate from the first storage location. In yet another example, each version of the instance of data may include additional metadata (e.g., a time/date that the version was created, a user who performed a change on the instance of data, etc.).

Further still, method 400 may proceed with operation 404, where a log of one or more events occurring during the performance of the CDP for the instance of data is created. In one embodiment, the one or more events may include system events that are identified within the system where the instance of data is stored (e.g., utilizing one or more hooks, one or more daemons, etc.). In another embodiment, the one or more events may include a change in an operating system version of the system where the instance of data is stored (e.g., a kernel update, etc.).

Also, in one embodiment, the one or more events may include a deletion of one or more portions of the instance of data (e.g., a table drop event, where the table is all or a portion of the instance of data). In another embodiment, the one or more events may include a predetermined security event (e.g., an identification of one or more malware events within the system where the instance of data is stored.

In addition, in one embodiment, the one or more events may include a custom event (e.g., a predetermined user-defined system event, etc.). In another embodiment, the log of the one or more events may be stored in an index (e.g., an event table, etc.).

Furthermore, method 400 may proceed with operation 406, where in response to identifying a conclusion of the performance of CDP for the instance of data, a value for the one or more events within the log is determined. In one embodiment, CDP may be performed for the instance of data for a predetermined time period (e.g., a predetermined number of minutes, hours, days, etc.). In another embodiment, CDP may be performed for the instance of data until the predetermined storage location used to store the plurality of versions of the instance of data reaches a predetermined capacity level.

Further still, in one embodiment, at the conclusion of the time period (or when the predetermined capacity level of the predetermined storage location is met), a notification may be sent indicating that CDP is no longer being performed for the instance of data. In another embodiment, the conclusion of the performance of CDP for the instance of data may initiate an age-out process for the instance of data. In yet another embodiment, during the age-out process for the instance of data, a numeric value may be determined for each of the one or more events.

For example, each of the one or more events may be compared to a table of events and corresponding numeric values. In another example, matching events may be assigned the corresponding numeric value stored in the table. In yet another example, one or more events may be input into a trained neural network, evaluation function, etc. that outputs a corresponding score for each event. In still another example, the numeric value for an event may correspond to a likelihood that one or more versions of the instance of data will be desired in the future. For instance, an event with a high numeric value may correspond to a higher likelihood that a version of the instance of data will be requested in the future (when compared to an event with a low numeric value).

Also, in one embodiment, for each of the one or more events, the value of the event may be stored as metadata in association with the event.

Additionally, method 400 may proceed with operation 408, where a snapshot of the instance of data is conditionally created and stored based on a comparison of the value for the one or more events to a predetermined threshold. In one embodiment, the values for each of the one or more events may be summed to determine a summed event value. In another embodiment, the summed event value may be compared to a predetermined event value threshold.

Further, in one embodiment, in response to determining that the summed event value exceeds the predetermined event value threshold, a snapshot of the instance of data may be created and stored in snapshot storage, and a most recent version of the instance of data may be stored in a predetermined data storage location (e.g., a home area volume, etc.). For example, the snapshot may include all versions of the instance of data that were created during the performance of CDP for the instance of data.

Further still, in one embodiment, the snapshot may be stored in a snapshot storage location that is physically separate from the predetermined data storage location where the plurality of versions of the instance of data are stored. For example, the snapshot storage location may include a first data storage drive, the predetermined data storage location may include a second data storage drive separate from the first data storage drive.

Also, in one embodiment, in response to determining that the summed event value does not exceed the predetermined event value threshold, a snapshot of the instance of data may not be created/stored, and the most recent version of the instance of data may be stored in the predetermined data storage location (e.g., the HAV, etc.). For example, the most recent version of the instance of data may not include all previous versions of the instance of data that were created during the performance of CDP for the instance of data. In another example, all versions of the instance of data that were created during the performance of CDP for the instance of data may be discarded (except for the most recent version of the instance of data).

In addition, in one embodiment, the predetermined data storage location in which the most recent version of the instance of data is stored (e.g., the HAV, etc.) may be separate from the log (e.g., a CDP log, etc.) where the plurality of versions of the instance of data were stored during the performance of CDP for the instance of data. In another embodiment, the snapshot of the instance of data may be used to perform a recovery of the instance of data (e.g., in response to a failure of the instance of data, a loss of the instance of data, a corruption of the instance of data, etc.).

In this way, in response to determining that events associated with an instance of data illustrate that the instance of data is of a predetermined value, multiple versions of the instance of data (created during the performance of CDP for the instance of data) may be maintained instead of being discarded after CDP has concluded for the instance of data. This may result in the storage of backup data for the instance of data at a higher level of detail (which may improve a security of such data by enabling a restoration of such data with a higher level of granularity, etc.). This may also reduce an amount of storage allocated for instances of data with a lower value, which may improve a performance of storage devices implementing backup storage for such data.

Furthermore, in one embodiment, the snapshot storage location may have a predefined capacity. In another embodiment, each snapshot stored within the snapshot storage location may have an associated entry date when the snapshot was stored within the snapshot storage location. For example, the entry date for a snapshot may be stored as metadata in association with the snapshot within the snapshot storage location.

Further still, in one embodiment, in response to determining that the predefined capacity (or a predetermined percentage of the predefined capacity) has been filled with snapshots, a snapshot with an oldest associated entry date may be removed from the snapshot storage location and stored in another location (e.g., cloud-based storage, etc.).

In this way, full snapshots of all versions of an instance of data may be maintained even when the snapshot storage location reaches its maximum storage capacity.

Also, in one embodiment, one or more snapshots may be conditionally merged within the snapshot storage location. For example, multiple snapshots for a single instance of data may be stored within the snapshot storage location. In another example, a value of the single instance of data may be determined for each of these snapshots (e.g., using data analysis, one or more predetermined cost equations, etc.). In yet another example, a value of the storage capacity necessary to store each of the snapshots may be determined (e.g., using data analysis, one or more predetermined cost equations, etc.).

Additionally, in one example, for a plurality of snapshots stored within the snapshot storage location, in response to determining that a ratio of the value of the single instance of data to the value of the storage capacity necessary to store the data exceeds a threshold amount, the multiple snapshots may be merged (e.g., to create a single merged snapshot stored within the snapshot storage location). In another example, for a plurality of snapshots stored within the snapshot storage location, in response to determining that a ratio of the value of the single instance of data to the value of the storage capacity necessary to store the data does not exceed a threshold amount, the multiple snapshots may be discarded and the most recent version of the instance of data may be stored in the predetermined data storage location (e.g., the HAV, etc.).

In this way, instances of data with a higher determined value may be stored with a higher level of detail (which may improve a security of such data by enabling a restoration of such data with a higher level of granularity, etc.).

Figure 5:
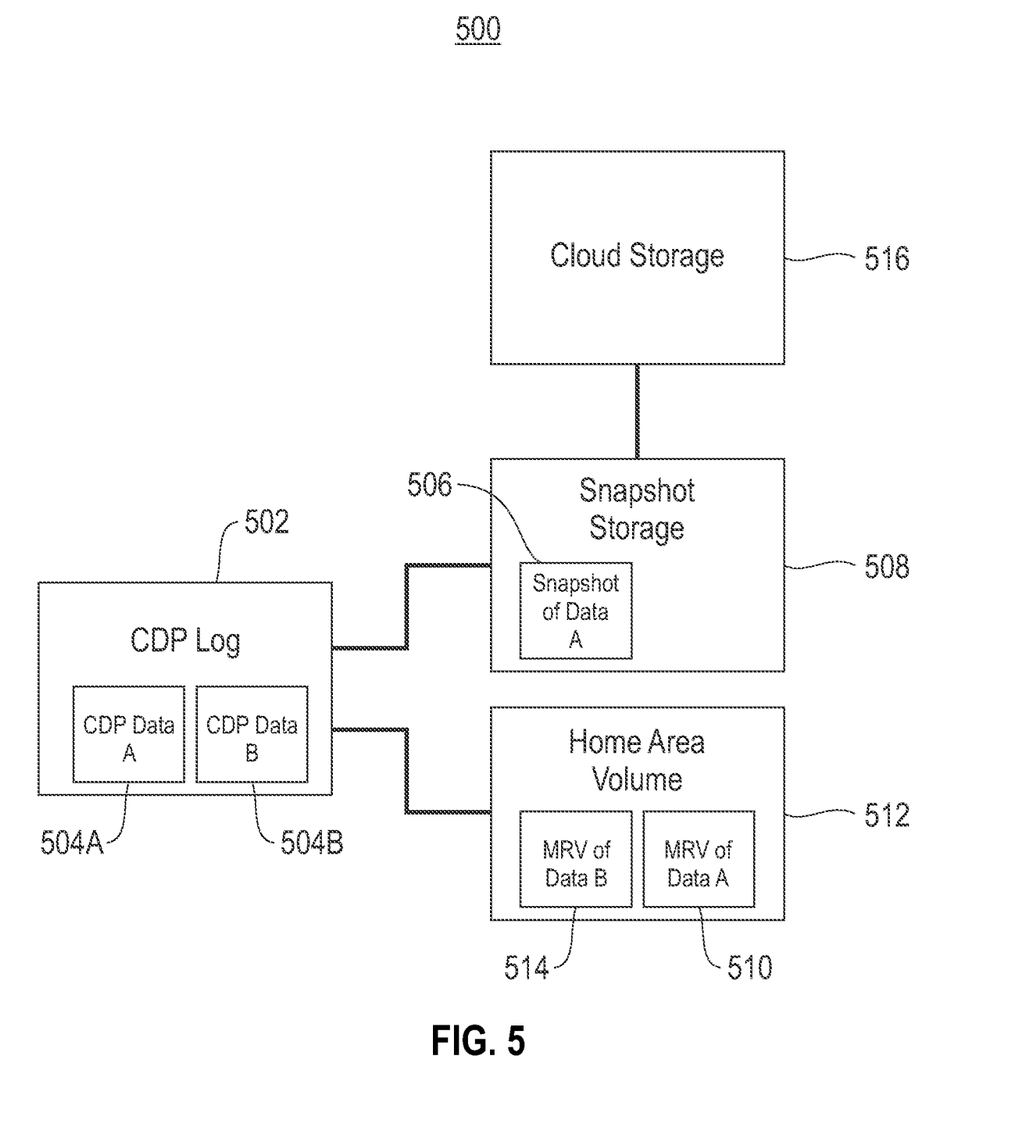
FIG. 5 illustrates an exemplary continuous data protection (CDP) age-out environment, in accordance with one embodiment of the present invention.

FIG. 5 illustrates an exemplary continuous data protection (CDP) age-out environment 500, according to one exemplary embodiment. As shown, a CDP log 502 stores a plurality of instances of CDP data 504A-B, where each instance of CDP data 504A and 504B includes one of more versions of an associated instance of data (e.g., a first instance of data and a second instance of data, respectively) created and stored within the CDP log 502 each time the associated instance of data is changed.

Additionally, in one embodiment, each of the plurality of instances of CDP data 504A-B may be created during a predetermined time period (e.g., a CDP time period). For example, a first instance of CDP data 504A may be created for a first instance of data during a first time period, and a second instance of CDP data 504B may be created for a second instance of data during a second time period. Further, in one embodiment, during the performance of CDP for the first instance of data, a first log of one or more system events may be created. Likewise, during the performance of CDP for the second instance of data, a second log of one or more system events may be created.

Further still, in one embodiment, in response to determining that a first time period has expired, CDP may stop being performed for the first instance of data, and a value may be determined for all events stored within the first log. These event values may be summed and compared against a predetermined threshold. In response to determining that the sum of the event values exceeds the predetermined threshold, a snapshot 506 of the instance of data may be created and stored in snapshot storage 508, and a most recent version 510 of the first instance of data may be stored in a home area volume 512.

Also, in one embodiment, in response to determining that a second time period has expired, CDP may stop being performed for the second instance of data, and a value may be determined for all events within the second log. These event values may be summed and compared against a predetermined threshold. In response to determining that the sum of the event values does not exceed the predetermined threshold, no snapshot is created and stored, and a most recent version 514 of the second instance of data may be stored in a home area volume 512.

Also, in response to determining that a predefined capacity of the snapshot storage 508 (or a predetermined percentage of the predefined capacity) has been filled with snapshots, a snapshot with an oldest associated entry date may be removed from the snapshot storage 508 and stored in a cloud storage location 516.

In this way, in response to determining (based on system events) that the first instance of data has a higher value than the second instance of data, historical data may be stored for the first instance of data at a higher granularity than for the second instance of data. This may improve protection of instances of data having a higher value, while minimizing the storage of backup data for instances of data having a lower value.

Event Value Snapshot Creation During CDP Age-Out

Continuous data protection (CDP) is a mechanism which saves every change made to storage data within a predetermined time delta, effectively capturing all revisions to the data within some finite amount of time. There may be two regions in a CDP system that operate differently: the region under CDP (the log) and the region no longer under CDP (the home area volume). When data is aged out of the log, it is no longer under CDP protection—data is no longer versioned, and there is no access to a snapshot mechanism (while in the log, snapshots can be created from arbitrary points).

CDP systems can potentially create a snapshot every second and keep it in a log so a user can restore to any arbitrary point within the log, but snapshot realization incurs overhead for both processing and storage, so it's infeasible to snapshot and store every single change in the log. Once age-out occurs, the ability to realize a versioned snapshot is lost. This may negatively affect the restoration of data that have been aged out.

Existing CDP solutions minimize data loss by capturing most or all changes to data for a fixed window of time (e.g., a predetermined number of days). After this time window expires, restore options are significantly reduced. This approach provides a good user experience (fast recovery time with fine grain points) while data is under CDP but does not fully address several scenarios where a user may need to restore from an older backup that has been aged-out of the protection window. This problem is exacerbated when a user selects a smaller window of time for CDP.

For example, in the event of a ransomware attack, the user may need to restore to a backup that is outside of the CDP window. Versioning information no longer exists for this data, so fine-grained recovery is not possible using the CDP system alone. This may result in unacceptable data loss for the user. Combining a CDP system with periodic secondary storage backups (e.g., a snapshot taken every 24 hours) can mitigate data loss, but may require additional customization of the system, and still may result in data loss depending on when the restore point needs to take place. Increasing the time window that a CDP system protects is not retroactive, and may result in additional costs to a user. Determining the "best" time window for CDP of an application or business is difficult because it assumes knowledge that the sizing takes into account all permutations of system failure, user error, malware, malicious activity, and service outages, then consider the probability of failure and make a judgement call on the value of how much data could be lost.

In response to these issues, important events may be detected and tagged in the log of a CDP system. When aging out data, the data may be checked to determine if tags are associated with the data. If the data is tagged, snapshots associated with that data are stored according to a budgeting function. This extends the usefulness of a CDP log beyond its normal lifetime without requiring extending the log.

Snapshots based on important events can be restored like those under CDP, but the snapshots persist after CDP window expires. The base system includes a list of system defaults that are considered generally important, but users have the ability to define and add their own. These events can be defined for a single volume or they can include a definition that snaps multiple volumes for "system wide" type events. These events are weighted, so that if multiple candidate tags are found but only a subsection should be saved, there is a deterministic method to make these decisions.

CDP Log and Age-Out

The CDP log is a write-only structure where all changes to disk are recorded sequentially. The log is designed to store a finite amount of data (based on capacity or time since the write occurred), and while data is in the log, snapshots can be created from any arbitrary point in the log. When data has reached a specified size or age, it is "aged-out" to the home area volume. The process of age-out involves designating the sections to remove from the log, removing versioning information, then storing the version-less data in the home area volume. The freed log storage is then available to store other information.

How Snapshots Work in a CDP System

Every time data is written to the system, it is kept in a log. At this point, a snapshot or restore point doesn't exist, but one can be created by triggering a snapshot realization mechanism. After selecting the point where a snapshot should be created (e.g. the timestamp), a signal is sent to the CDP system to create a snapshot for that point. If the point is outside of the log, this snapshot cannot be created. Once a snapshot is created, it is stored outside the volume it came from (e.g., in a filesystem outside of the volume, but on the same system). This snapshot can be restored to access the state of the system at the timepoint when it was created. Note that snapshots can be created by the storage layer (e.g., by trimming the log then creating a snapshot).

Snapshot Restoration

When a snapshot is created, it is stored in a backup file that may be all-inclusive or chained (e.g., QCOW2). When a user wants to restore a particular backup file, a volume is mounted and the snapshot is restored to that volume. Snapshots of data that has been aged-out of the log is restored in the same way as data that still resides in the log.

Event Detection

Events are detected in the system based on meeting specific criteria that is defined by the system and users. When some such criteria is met, the logical block addressing (LBA) is tagged with the event description. Event detection polls storage system state, meaning that changes outside storage are not considered.

All event detection mechanisms require returning a True or False value. When the state changes, either from True to False or False to True, that change designates the detection of an event with a unique ID. If multiple events occur within the same unit of time, all are added to the same time window. This generic event tagging system allows for high flexibility in determining events of interest to the user.

For example, a client may want to retain all revisions of a particular file, forever. The user may specify the mechanism to query the last updated time of the file. If it hasn't been changed, it will return False. If it has changed, that value will toggle to True and generate an event.

In another example, a business has an important SQL table that should always exist for business continuity. The event detection function runs a SELECT* query on that table, and if the table exists and returns values, then a True value is returned. If the table is dropped or doesn't return valid values, a False value is returned an event is generated.

In yet another example, an individual wants to detect if a block storage region has been changed since a fixed point in time, based on a percentage. If the region has changed by less than a specified percentage since last snapshot, a False value is returned. Otherwise, a True value is returned and an event is generated and the "last snapshotted" time is updated. Note that in this case, only the rising edge (F→T) may matter.

Event Tagging

In one embodiment, event tags are kept alongside, but exclusive of, the CDP log, and are evicted at the same frequency of age-out. Tags are event IDs that can exist as raw values stored in a lookup table that references a particular event detection function, the value of that event occurring, and a unique event ID. If a snapshot is generated based on a particular set of events, metadata is added to the snapshot to label which events are present on it, which can be used to query snapshots to find particular backup events faster.

Event Values

In one embodiment, each type of event comes with a corresponding value, or weight, that indicates how important it is to a user or business. The higher the value, the more important the event is considered to be. The system comes with an initial set of weights and detection functions. In an attempt to make this system as flexible as possible, users can add their own detection functions, specify values for system-defined events, and set the threshold value that governs snapshot generation.

Budgeting System

In one embodiment a list of events may exist that can be detected by the system, where each event has a score and ID. When age-out occurs, events detected in that unit of age-out are scored, and a size of a capacity reduction is calculated. If the event score and capacity reduction are above a threshold, a snapshot is created to capture a state of the storage at this point. If the score is below the threshold, snapshot creation is deferred.

For example, the threshold may be initially set at 1, such that any detected event gets backed up. If a user finds that this generates too many snapshots, the user may raise this threshold or re-value weights of detected events.

Limit Number of Snapshots on a System Before Offloading to Cloud

In one embodiment, a log may be kept of a number of times restored per snapshot, an amount of storage used by snapshots, and a time since snapshot creation. When snapshots need to be archived (e.g., when local storage exceeds a predetermined capacity set by a user), the snapshots may be ordered by the number of times restored, and then by the time since snapshot creation. One objective may be to keep the most useful snapshots around locally, and to offload others to the Cloud. These may not be arbitrarily deleted, as a thresholding mechanism will not create them in the first place if they have a low value.

Unit of Age-Out

One exemplary unit of age-out may include a time window. For example, when LBAs are ready to be aged out, the log may be referenced for this amount of time to determine which other blocks can be aged out in a group. A default unit may be a unit of time such as an hour, but this may be user configurable.

Table 1 illustrates an exemplary algorithm for determining a value of a single LBA at a single volume, according to one exemplary embodiment.

TABLE 1

$$\text{value}_{LBA} = \sum_{k=0}^{total\_events} \text{value}_{eventID_i}, \text{ where an } LBA \text{ values } k \text{ events}$$

As shown in Table 1, the value of the LBA is the sum of the value of all the events that were detected for that LBA.

Table 2 illustrates an exemplary algorithm for determining a value of a single time window at a single volume, according to one exemplary embodiment.

TABLE 2

$$\text{value}_{time\_window} = \sum_{i=0}^{total\_LBAs} \text{value}_{LBA_i}, \text{ where time\_window comprises } n \text{ LBAs}$$

As shown in Table 2, the value of a time window is the sum of the value of all LBAs within that time window.

Table 3 illustrates an exemplary event valuation table, according to one exemplary embodiment.

TABLE 3

| Event ID | Evaluation Function Description | Event Type | Event Origin | Evaluation Function | Value |
|---|---|---|---|---|---|
| kernel_update | checks kernel version | Admin action | system provided | <function> | 5 |
| sql_drop | checks if SQL table drop event occurred | SQL | system provided | <function> | 10 |
| security_event | third party API flags security event | Security | user provided | <function> | 20 |

TABLE 3-continued

| Event ID | Evaluation Function Description | Event Type | Event Origin | Evaluation Function | Value |
|---|---|---|---|---|---|
| user_custom_1 | custom user application event | Application | user provided | <function> | 1 |

In one embodiment, the threshold value defaults to 1 (any event triggers a snapshot), but this can be changed by users at runtime to capture fewer snapshots if this generates too many snapshots. If the same LBA is updated repeatedly within the same time window, its value is coalesced (e.g., the value gets the full value once, then a zero value for subsequent detections within the same time window).

Table 4 illustrates an exemplary snapshotting algorithm based on a capacity—event value trade-off, according to one exemplary embodiment.

TABLE 4

Variables
    - Log size (L) covering N events
    - Size of the snapshot (X)
      resulting from aging out (L)
    - User provided threshold
      value (Th) per GB
For each time_window
    - A := X / L // Capacity Reduction
    - If V(e=1->n) > 0: // Snapshot
      Value: based on cumulative value
        • B := 1 / V(e=1->n)
    - Else:
      • B:=1
    - If A / B > Th
      • Ageout(L);
      • Snapshot_HVA( );
    - Else
      • Continue;
General case: will take periodic snapshots
    based on trade-off presented above
Extreme case: High value LBA triggers
    immediate snapshot (set single event
    value high)
Extreme case: no events detected, but will
    eventually snapshot when backup size
    min is met Table 5 illustrates an exemplary age-out/snapshot merging algorithm based on an event value-capacity trade-off, according to one exemplary embodiment.

TABLE 5

Relative Value of an Event e
RV = Ve / (Ae . De), where...
    - V - Value of the event (e.g. from
    user provided table)
    - A - Age of the event
    - D - Time interval to the
    closest recovery point
    - When Sum(RVL)/L + Sum(RVS)/
    S < THlower, where
    - RV(L/S) - Relative Value of an
    event in the log/snapshot
    - L - Size of the log
    - S - Aggregate size of all snapshots
    - THupper - Upper threshold
    of Value per Capacity
    - Compare to increase Value per
    Capacity above THupper
    - Merge
      • Sum(RVL)/L + Sum(RVS)/(S − Rs)
      • Rs - Reduction size due to merging
- Age-Out
    • Sum(RVL)/(L − XL) +
    Sum(RVS)(S + Xs), where
    • XL - Size of the log aged out
Xs - Size of the snapshot generated
from log size XL In one embodiment, snapshots may be created when data is aged-out of a CDP log if the value of the aged-out events in the CDP log is greater than a threshold. Additionally, a valuation system may be provided for events detected while data is under CDP that determines the relative worth of events detected for the unit of age-out. Further, an algorithm may be provided to perform snapshots based on the trade-off between the event value, to restore granularity and capacity. Further still, an algorithm may be provided to use a trade-off between snapshot merge and age-out to retain value per capacity of the volume consisting of a log and snapshots.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    creating a log of one or more events occurring during a performance of continuous data protection (CDP) for an instance of data;
    in response to identifying a conclusion of the performance of CDP for the instance of data, determining a value for the one or more events within the log; and conditionally creating and storing a snapshot of the instance of data, based on a comparison of the value for the one or more events to a predetermined threshold, wherein the snapshot of the instance of data is stored in a snapshot storage location with a predefined capacity.

2. The computer-implemented method of claim 1, wherein during the performance of CDP for the instance of data, a new version of the instance of data is created and stored in a predetermined storage location each time the instance of data is changed.

3. The computer-implemented method of claim 1, wherein the one or more events include system events that are identified within a system where the instance of data is stored.

4. The computer-implemented method of claim 1, wherein the one or more events include a change in an operating system version of a system where the instance of data is stored.

5. The computer-implemented method of claim 1, wherein the one or more events include a deletion of one or more portions of the instance of data.

6. The computer-implemented method of claim 1, wherein the one or more events include a custom event.

7. The computer-implemented method of claim 1, wherein CDP is performed for the instance of data for a predetermined time period.

8. The computer-implemented method of claim 1, wherein:
the conclusion of the performance of CDP for the instance of data initiates an age-out process for the instance of data, and
during the age-out process for the instance of data, a numeric value is determined for each of the one or more events.

9. The computer-implemented method of claim 1, wherein:
values for a plurality of the events are summed to determine a summed event value, and
the summed event value is compared to a predetermined event value threshold.

10. The computer-implemented method of claim 9, wherein in response to determining that the summed event value exceeds the predetermined event value threshold:
a snapshot, that includes all versions of the instance of data that were created during the performance of CDP for the instance of data, is created and stored in snapshot storage, and
a most recent version of the instance of data is stored in a predetermined data storage location.

11. The computer-implemented method of claim 9, wherein in response to determining that the summed event value does not exceed the predetermined event value threshold:
a snapshot of the instance of data is not created, and
a most recent version of the instance of data is stored in a predetermined data storage location, where the most recent version of the instance of data does not include all previous versions of the instance of data that were created during the performance of CDP for the instance of data.

12. The computer-implemented method of claim 1, wherein in response to determining that the predefined capacity has been filled with snapshots, a snapshot with an oldest associated entry date is removed from the snapshot storage location and stored in cloud-based storage.

13. The computer-implemented method of claim 1, wherein two or more snapshots are conditionally merged within the snapshot storage location, based on one or more criteria.

14. A computer-implemented method, comprising:
creating a log of one or more events occurring during a performance of continuous data protection (CDP) for an instance of data;
in response to identifying a conclusion of the performance of CDP for the instance of data, determining a value for the one or more events within the log; and
conditionally creating and storing a snapshot of the instance of data, based on a comparison of the value for the one or more events to a predetermined threshold, wherein the one or more events include a predetermined security event.

15. The computer-implemented method of claim 14, wherein during the performance of CDP for the instance of data, a new version of the instance of data is created and stored in a predetermined storage location each time the instance of data is changed.

16. A computer program product comprising one or more computer readable storage media, and program instructions collectively stored on the one or more computer readable storage media, the program instructions comprising instructions configured to cause one or more processors to perform a method comprising:
creating, by the one or more processors, a log of one or more events occurring during a performance of continuous data protection (CDP) for an instance of data;
in response to identifying a conclusion of the performance of CDP for the instance of data, determining, by the one or more processors, a value for the one or more events within the log; and
conditionally creating and storing, by the one or more processors, a snapshot of the instance of data in a snapshot storage location with a predefined capacity, based on a comparison of the value for the one or more events to a predetermined threshold.

17. The computer program product of claim 16, wherein in response to determining that the predefined capacity has been filled with snapshots, a snapshot with an oldest associated entry date is removed from the snapshot storage location and stored in cloud-based storage.

18. The computer program product of claim 16, wherein two or more snapshots are conditionally merged within the snapshot storage location, based on one or more criteria.

19. The computer program product of claim 16, wherein the one or more events include a predetermined security event.

20. The computer program product of claim 16, wherein during the performance of CDP for the instance of data, a new version of the instance of data is created and stored in a predetermined storage location each time the instance of data is changed.

* * * * *